(12) United States Patent
Hoppe

(10) Patent No.: US 10,197,802 B2
(45) Date of Patent: Feb. 5, 2019

(54) BIOCULAR COMPACT COLLIMATION APPARATUS

(71) Applicant: Intevac, Inc., Santa Clara, CA (US)

(72) Inventor: Michael James Hoppe, Vista, CA (US)

(73) Assignee: INTEVAC, INC., Santa Clara, CA (US)

( * ) Notice: Subject to any disclaimer, the term of this patent is extended or adjusted under 35 U.S.C. 154(b) by 0 days.

(21) Appl. No.: 15/663,563

(22) Filed: Jul. 28, 2017

(65) Prior Publication Data

US 2018/0031835 A1 Feb. 1, 2018

Related U.S. Application Data

(60) Provisional application No. 62/368,842, filed on Jul. 29, 2016.

(51) Int. Cl.

| | |
|---|---|
| *G02B 5/30* | (2006.01) |
| *G02B 27/01* | (2006.01) |
| *G02B 27/28* | (2006.01) |
| *G02B 27/30* | (2006.01) |
| *G02F 1/1335* | (2006.01) |

(Continued)

(52) U.S. Cl.
CPC ....... *G02B 27/0149* (2013.01); *G02B 5/3025* (2013.01); *G02B 5/3083* (2013.01); *G02B 27/0025* (2013.01); *G02B 27/0101* (2013.01); *G02B 27/283* (2013.01); *G02B 27/288* (2013.01); *G02B 27/30* (2013.01); *G02F 1/13363* (2013.01); *G02F 1/133536* (2013.01); *G02B 2027/011* (2013.01); *G02B 2027/015* (2013.01); *G02B 2027/0136* (2013.01);

(Continued)

(58) Field of Classification Search
CPC ............ G02B 27/0149; G02B 27/0025; G02B 27/0101; G02B 27/283; G02B 27/286; G02B 27/20; G02B 5/3025; G02B 5/3083; G02B 27/30; G02F 1/33536; G02F 1/13363; G02F 2001/133541; G02F 2001/133638
USPC ............... 359/485.01, 489.07, 641, 727, 732
See application file for complete search history.

(56) References Cited

U.S. PATENT DOCUMENTS

| 4,653,875 A | * | 3/1987 | Hines | ................. G02B 17/0605 359/485.04 |
| 5,715,023 A | * | 2/1998 | Hoppe | ................. G02B 5/3016 349/11 |

(Continued)

*Primary Examiner* — Ricky D Shafer
(74) *Attorney, Agent, or Firm* — Womble Bond Dickinson (US) LLP; Joseph Bach, Esq.

(57) ABSTRACT

A compact, lightweight, multi-wavelength display system which can be used for simultaneous viewing with both eyes is provided. The system utilizes a field flattener lens to remove abrasions introduced by the system's lenses. The system also uses a polarization selective optical element that reflects one linear polarization state while transmitting radiation of the orthogonal linear polarization state. The PS element is used in combination with a quarter wave plate and an optical element, the optical element including a partially reflective surface. The optical element may either be a single element or an optical doublet. In the latter configuration, the partially reflective surface is at the interface between the two singlets that comprise the doublet. The system also includes an image source that either alone, or in combination with other optical elements, produces circularly polarized light of the desired rotary sense.

20 Claims, 5 Drawing Sheets

(51) Int. Cl.
*G02F 1/13363* (2006.01)
*G02B 27/00* (2006.01)

(52) U.S. Cl.
CPC ........... *G02B 2027/0165* (2013.01); *G02F 2001/133541* (2013.01); *G02F 2001/133638* (2013.01)

(56) References Cited

U.S. PATENT DOCUMENTS

| | | | |
|---|---|---|---|
| 6,075,651 A | 6/2000 | Hoppe | |
| 6,266,194 B1* | 7/2001 | Tanijiri | G02B 27/0172 359/630 |
| 6,271,969 B1* | 8/2001 | Mertz | G02B 27/0172 359/489.07 |
| 6,400,493 B1* | 6/2002 | Mertz | G02B 27/0172 359/301 |
| 6,421,183 B1* | 7/2002 | Ophey | G02B 27/0172 349/13 |
| 6,710,928 B2* | 3/2004 | Roest | G02B 27/0172 359/631 |
| 9,557,568 B1* | 1/2017 | Ouderkirk | B29D 11/00644 |
| 2004/0014505 A1* | 1/2004 | Rainish | H04W 52/0225 455/574 |
| 2006/0232862 A1* | 10/2006 | Steven | G02B 27/28 359/489.07 |
| 2007/0273970 A1* | 11/2007 | Hoppe | G02B 27/28 359/489.07 |
| 2010/0177113 A1* | 7/2010 | Gay | G02B 27/2214 345/589 |

\* cited by examiner

BIOCULAR COMPACT COLLIMATION APPARATUS

RELATED APPLICATION

This Application claims priority benefit from U.S. Provisional Application, Ser. No. 62/368,842, filed on Jul. 29, 2016, the disclosure of which is incorporated herein in its entirety.

BACKGROUND

1. Field

The disclosed invention relates to optical imaging systems for relaying images rendered on a display.

2. Related Art

There is always a need for more compact visual systems, especially in confined spaces such as a vehicle. An example of such system includes head down display systems which include optical imaging that relay an image rendered on a display screen to a user's eye in a collimated fashion. One design for such an optical system is described in U.S. Pat. No. 6,075,651, which relays an image for a single-eye viewing, i.e. monocular. However, there is also a need to provide such compact optical systems that enable viewing with both eyes, i.e., binocular system.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments provide a compact design form that allows for a small overall size, while enabling viewing the image with both eyes. In this design form, to achieve good optical performance, the system generates a flat field, collimated light, that is provided on an aperture sufficiently large to be viewable with both eyes simultaneously.

In the disclosed embodiments a field flattener lens is used to generate an image that is sharp from center to edge, even when utilizing large aperture viewed with two eyes. Additionally, a collimating arrangement is used to generate a collimated display, i.e., the image is focused at infinity. The design allows for a compact package that utilizes a thin packaging, while the collimated nature of the system allows the user to be very close to the system thus allowing use in very tight situations (i.e. vehicle). The collimated nature of the system allows for insensitivity in high motion environments. Because the display distance is effectively a large distance away from the user (collimated) it is not susceptible to motions and vibrations that may be experienced in a vehicle.

According to disclosed aspect, an optical collimating apparatus for focusing an image at infinity or at a desired finite distance as viewed by an observer is provided, the apparatus comprising: an observation aperture configured for enabling viewing with two eyes simultaneously; an image source for producing said image with light of at least a first rotary sense of circular polarization; an optical element having a first side proximate to said image source; a partially reflective coating deposited on a surface of said optical element; a field flattener lens interposed between the image source and the observation aperture; a quarter wave plate proximate to a second side of said optical element, said quarter wave plate altering said first rotary sense of circular polarization to a first linear sense of polarization; and a polarization selective optical element proximate to said quarter wave plate, said polarization selective optical element substantially reflecting light of said first linear sense of polarization without altering said first linear sense of polarization, and said polarization selective optical element substantially transmitting light of a second linear sense of polarization, wherein said second linear sense of polarization is orthogonal to said first linear sense of polarization.

The surface of said optical element may be concave. The surface of said optical element may be equivalent to said first side of said optical element. The surface of said optical element may be equivalent to said second side of said optical element. The optical element may comprise: a first optical singlet having a first surface and a second surface; and a second optical singlet having a first surface and a second surface, said first surface of said first optical singlet coupled to said first surface of said second optical singlet, wherein said partially reflective coating is interposed between said first surface of said first optical singlet and said first surface of said second optical singlet.

The first surface of said first optical singlet may be concave, said second surface of said first optical singlet may be plano, said first surface of said second optical singlet may be convex, and said second surface of said second optical singlet may be plano. The image source may be comprised of a liquid crystal display transmitting linearly polarized light and a circular polarizer for converting said linearly polarized light to at least said first rotary sense of circular polarization.

The image source may be comprised of a liquid crystal display transmitting linearly polarized light and a quarter wave retarder element for converting said linearly polarized light to at least said first rotary sense of circular polarization. Also, the image source may be comprised of a non-polarizing source, a linear polarizing element, and a circular polarizer for converting linearly polarized light to at least said first rotary sense of circular polarization. The image source may be also comprised of a non-polarizing source, a linear polarizing element, and a quarter wave retarder element for converting linearly polarized light to at least said first rotary sense of circular polarization.

The apparatus may further comprise a polarizing element bonded to an exit surface of said polarization selective optical element. The apparatus may further comprise an anti-reflection coating bonded to an exit surface of said polarizing element. The apparatus may further comprise a combiner element to combine said image with a second image produced by a second image source, said second image source in the line-of-sight of the observer, said combiner element interposed between said second image source and said first side of said optical element. The apparatus may further comprising a combiner element to combine said image with a second image produced by a second image source, said second image source in the line-of-sight of the observer, said combiner element interposed between said second image source and said second surface of said first optical singlet.

The field flattener lens may be interposed between the image source and the optical element. The image source may be adhered to the field flattener lens.

According to further disclosed embodiments, an optical apparatus for combining a first image and a second image is provided, the apparatus comprising: a flat panel display producing said first image; an inlet aperture for admitting said second image; a viewing window configured to enable viewing with both eyes simultaneously; a field flattener lens interposed between the flat panel display and the viewing window; a first optical singlet having a first surface and a second surface; a second optical singlet having a first surface and a second surface, said first surface of said first optical singlet coupled to said first surface of said second optical singlet; a partially reflective coating interposed between said first surface of said first optical singlet and said first surface of said second optical singlet; a combiner configured for reflecting light from the flat panel display and transmitting light from the inlet aperture; a circular polarizer proximate to said second surface of said first optical singlet, wherein said circular polarizer converts light of said first linear polarization to light of said first rotary sense of circular polarization; a quarter wave plate proximate to said second surface of said second optical singlet, said quarter wave plate altering said first rotary sense of circular polarization to a first linear sense of polarization; and, a polarization selective optical element proximate to said quarter wave plate, said polarization selective optical element substantially reflecting light of said first linear sense of polarization without altering said first linear sense of polarization, and said polarization selective optical element substantially transmitting light of a second linear sense of polarization, wherein said second linear sense of polarization is orthogonal to said first linear sense of polarization.

The combiner may comprise: a polarizing beam splitter interposed between said flat panel display and said second surface of said first optical singlet, wherein a portion of said light of said first linear polarization and within said first wavelength band from said flat panel display is reflected by said polarizing beam splitter toward said first optical singlet, wherein at least a portion of light from said second image source is transmitted by said polarizing beam splitter toward said first optical singlet. The field flattener lens may be interposed between the flat panel display and the combiner. The field flattener lens may be adhered to the flat panel display.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Embodiments of the inventive binocular system will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

A compact, multi-wavelength display system which can be used as a collimating display assembly viewable with both eyes simultaneously is provided. In one embodiment the optical system is implemented as a small monitor that is collimated to be presented to the user as a larger monitor by having the image focused at infinity. Some of the benefits of this system are compact size, use a small display to make effectively a larger monitor and the collimated nature of the system allows for it to be motion insensitive in locations such as vehicles.

The system utilizes a polarization selective optical element, or PS element, that reflects one linear polarization state while transmitting radiation of the orthogonal linear polarization state. The PS element is used in combination with a quarter wave plate and an optical element, the optical element including a partially reflective surface. The optical element may either be a single element or an optical doublet. In the latter configuration, the partially reflective surface is at the interface between the two singlets that comprise the doublet. The system also includes an image source that either alone, or in combination with other optical elements, produces circularly polarized light of the desired rotary sense.

A field flattener lens is used to improve the image projected from the viewing screen. Notably, contrary to using the field flattener lens in a single eye-piece configuration, here the field flattener lens is used in a system wherein the image is projected from a viewing screen that is viewable by both eyes simultaneously. The field flattening lens is added to the system to remove aberrations that may be introduced by the lenses, especially at the edges of the image.

Figure 1:
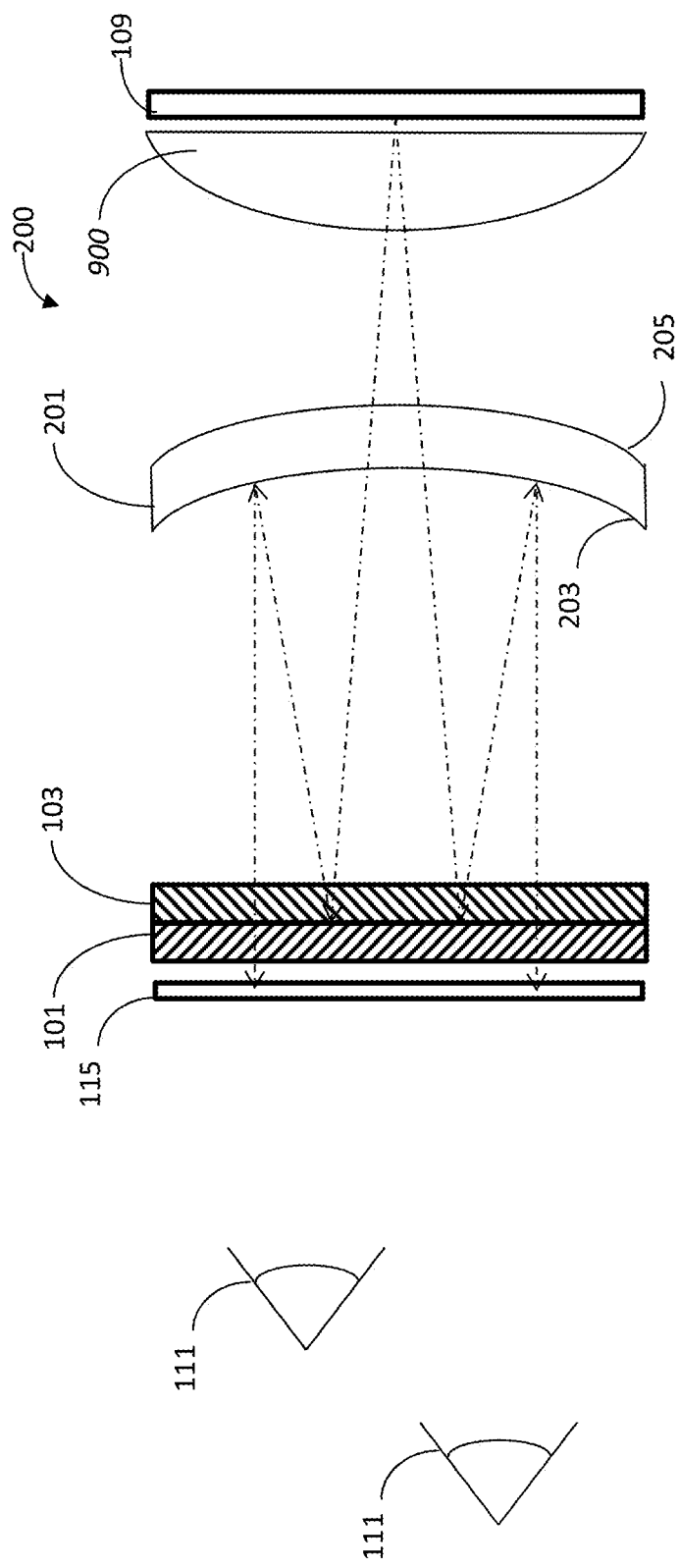
FIG. 1 is an illustration of an embodiment of the invention utilizing a field flattener lens, a PS element and a single optical element.

FIG. 1 illustrates the simplest embodiment of the optical device, showing both eyes (111) viewing the image on the image source (109), e.g., a flat panel display, LCD, OLED, etc. In this particular example the source 109 produces circularly polarized light. A combining element (201) is provided with AR coating (205) and partially reflective coating (203). In this particular embodiment coating 203 is a dielectric coating with a transmittance of approximately 50 percent and a reflectance of approximately 50 percent in the wavelength range of interest. The curvature of the surfaces of element 201 is designed to produce a collimated image from source 109, for example at a viewing window 115. Although the production of a collimated image is the preferred application of the invention, the system can also be used for other applications. In addition, there is a retarding element (103) and a reflective polarization selective element (101). The retarding element (103) and a reflective polarization selective element (101) are made to match the size of the viewing window 115. Viewing window 115 is sufficiently large to enable viewing with both eyes simultaneously.

In this embodiment a field flattener lens (900) is positioned in front of display (109). The addition of field flattener lens (900) with positive power at this location in the system flattens the field and makes the image look more like a picture on a wall and less like a picture on a curved surface. That is, in this design the goal is to project the flat image from the flat image source 109 with minimum aberration at the image's edges. The insertion of the field flattener lens ahead of the image source 109 helps achieve this goal.

In operation, the light from the image source 109 passes through the field flattener lens 900 and is preconditioned for the aberrations that will be introduced by lend 201. A portion of the light passing through field flattener lens 900 will pass unheeded through coating 203. The amount of light passed is dependent upon the reflectivity of coating 203. The polarization of the light passing through coating 203 is unaltered. The circularly polarized light passing through coating 203 passes through quarter wave plate 103 causing the circularly polarized light to become linearly polarized. The system is designed such that PS element 101 reflects the particular polarization of the linearly polarized light passing through polarizer 103. As the light reflected by PS element 101 passes through quarter wave plate 103 again (in the reverse direction), the polarization is changed from linear polarization to circularly polarized light of the same handedness as the light produced by source 109. A portion of this light is reflected by coating 203, the amount reflected being dependent upon the reflectivity of coating 203. The polarization of the light reflected by coating 203 will be reversed, thus allowing it to pass virtually unheeded through the combination of PS element 101 and quarter wave plate 103. The image created by the light passing through the system depends primarily upon the curvature of the surfaces of lens 201. For example, lens 201 can be designed to form a collimated image.

Figure 2:
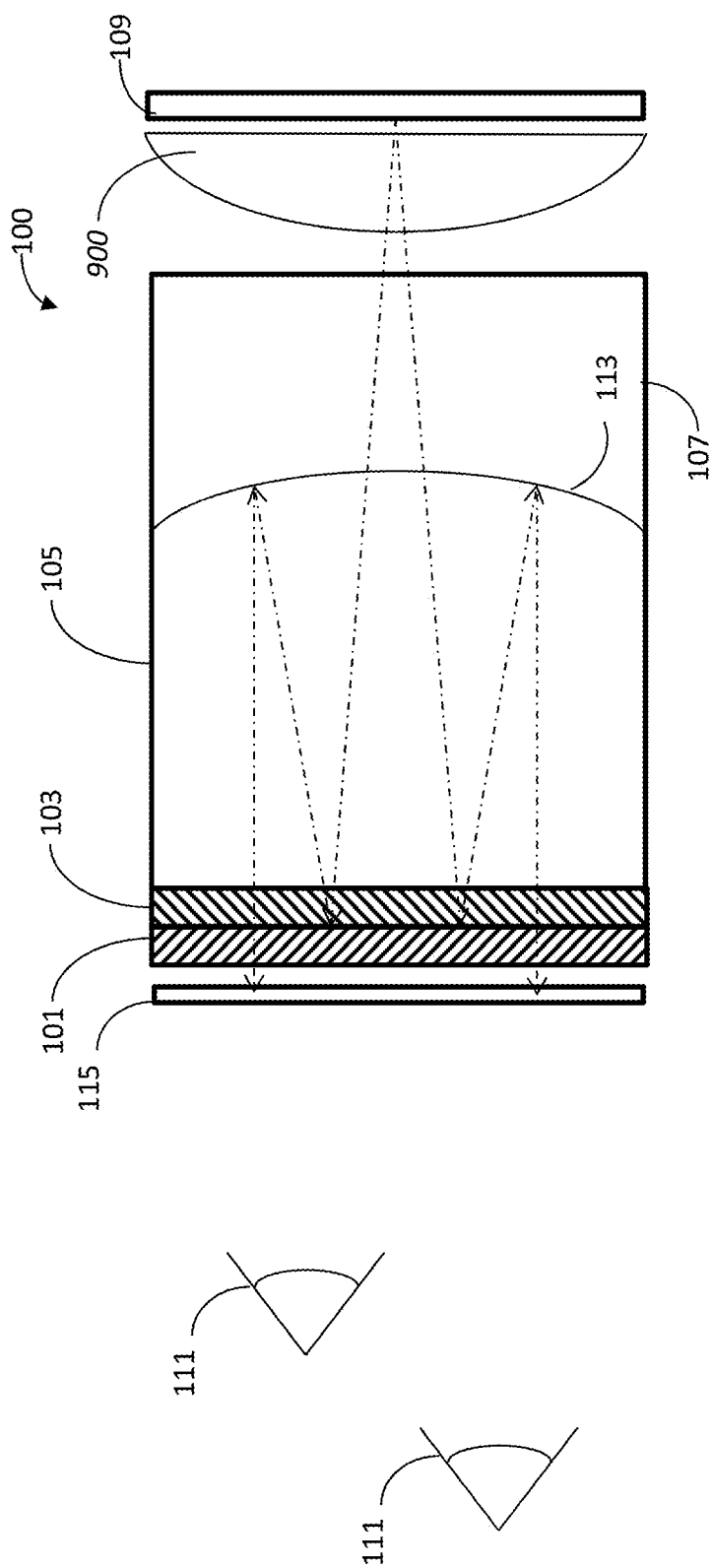
FIG. 2 is an illustration of an embodiment similar to that shown in FIG. 1 except that it uses an optical doublet.

FIG. 2 is an embodiment showing lens 201 replaced by a doublet 100 with the partially reflective surface coating (113) embedded in a doublet (100) that is made up of two lens elements (105 and 107) that may or may not be of the same material. Otherwise the design is the same as that shown in FIG. 1. The curvature of the optical doublet 100 is designed to produce a collimated image from source 109. Although the production of a collimated image is the preferred application of the invention, the system can also be used for other applications. Notably, since in this system the doublet 100 introduces fewer element-to-air interfaces, it is more efficient than the embodiment of FIG. 1.

In operation, the light from the image source 109 passes through the field flattener lens 900 and is preconditioned for the aberrations that will be introduced by lens 201. A portion of the light passing through field flattener lens 900 will pass unheeded through coating 113. The amount of light passed is dependent upon the reflectivity of coating 113. The polarization of the light passing through coating 113 is unaltered. The circularly polarized light passing through coating 113 passes through quarter wave plate 103 causing the circularly polarized light to become linearly polarized. The system is designed such that PS element 101 reflects the particular polarization of the linearly polarized light passing through polarizer 103. As the light reflected by PS element 101 passes through quarter wave plate 103 again, the polarization is changed from linear polarization to circularly polarized light of the same handedness as the light produced by source 109. A portion of this light is reflected by coating 113, the amount reflected being dependent upon the reflectivity of coating 113. The polarization of the light reflected by coating 113 will be reversed, thus allowing it to pass virtually unheeded through the combination of PS element 101 and quarter wave plate 103. The image created by the light passing through the system depends primarily upon the curvature of coated surface 113. For example, surface 113 can be designed to form a collimated image.

Figure 3:
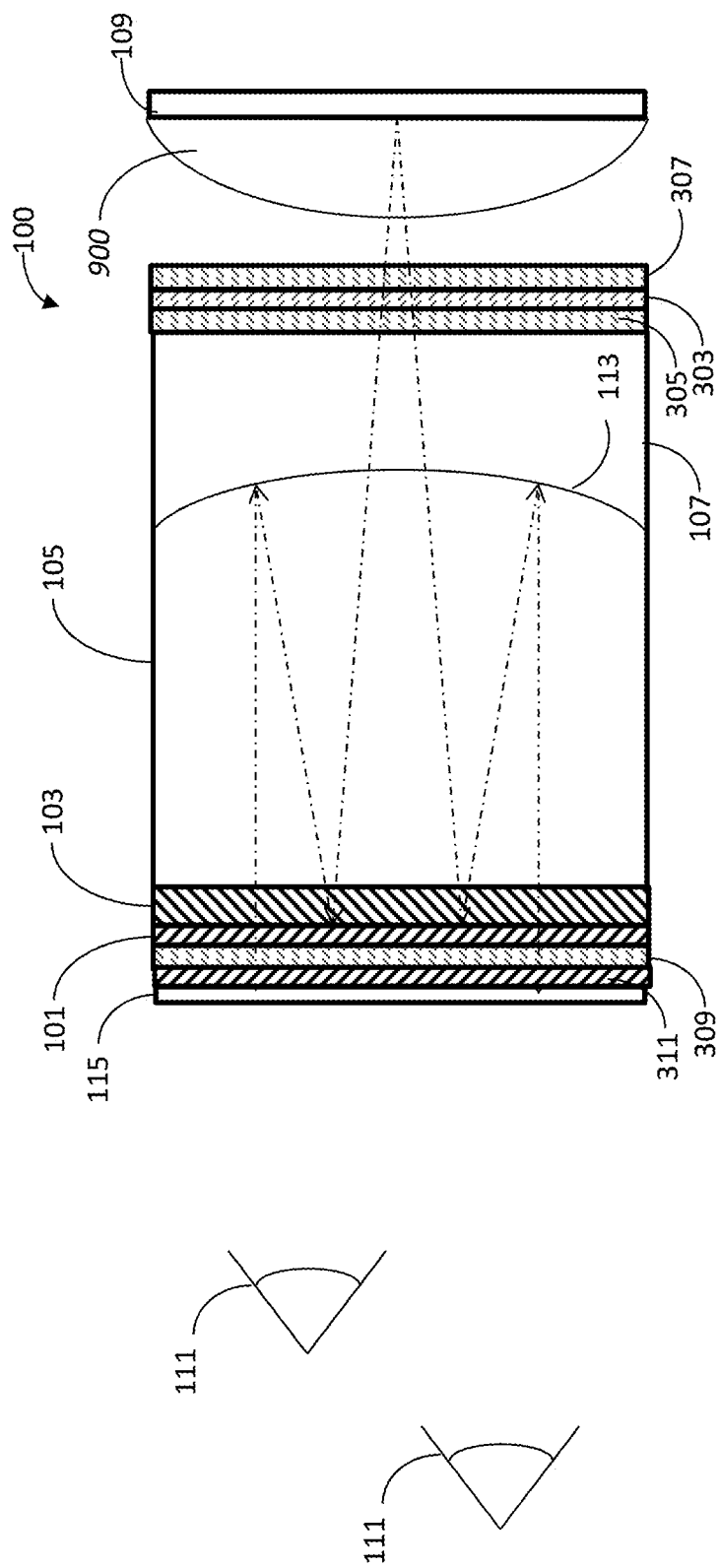
FIG. 3 is an illustration of another embodiment utilizing a field flattener lens, a PS element and an optical doublet.

FIG. 3 illustrates an alternative embodiment employing a field flattener lens (900) for enhanced imaging. In this embodiment a field flattener lens (900) is positioned in front of image source (109). The addition of field flattener lens (900) with positive power at this location in the system flattens the field to avoid aberrations introduced by the system's lenses. Also, optionally the image source is adhered to the field flattener lens 900, thereby eliminating two element-to-air interfaces.

This embodiment, as in the embodiment illustrated in FIG. 2, is comprised of a plano-convex singlet 105, a plano-concave singlet 107, and a partially reflective coating 113 interposed between singlets 105 and 107. It is understood that the 105/107 doublet can be replaced with an element similar to element 201 of FIG. 1 while retaining the distinctive features of this embodiment. This embodiment also includes PS element 101 and quarter wave plate 103.

This embodiment of the invention uses an image source 109 that produces randomly polarized light. Any number of source types can be used in this embodiment, for example source 109 can be a cathode ray tube (CRT), LCD, OLED, etc. The light from source 109 is first passed through field flattener lens 900, and is then linearly polarized with a polarizer 303 and then passed through a quarter wave retarder 305 which circularly polarizes the image light to the same rotary sense as that required by the PS element/quarter wave plate combination. To reduce reflectance losses, an anti-reflection (AR) coating 307 may be optionally applied to the outer surface of polarizer 303. The light which passes through the display system, including the PS element/quarter wave plate combination, then passes through an optional coating stack in order to improve image contrast and reduce ghosting. This stack is comprised of a polarizer 309 and an AR coating 311. In an alternate embodiment, polarizer 303 and retarder 307 are coupled directly to field flattener lens 900, optionally via index matching material.

Figure 4:
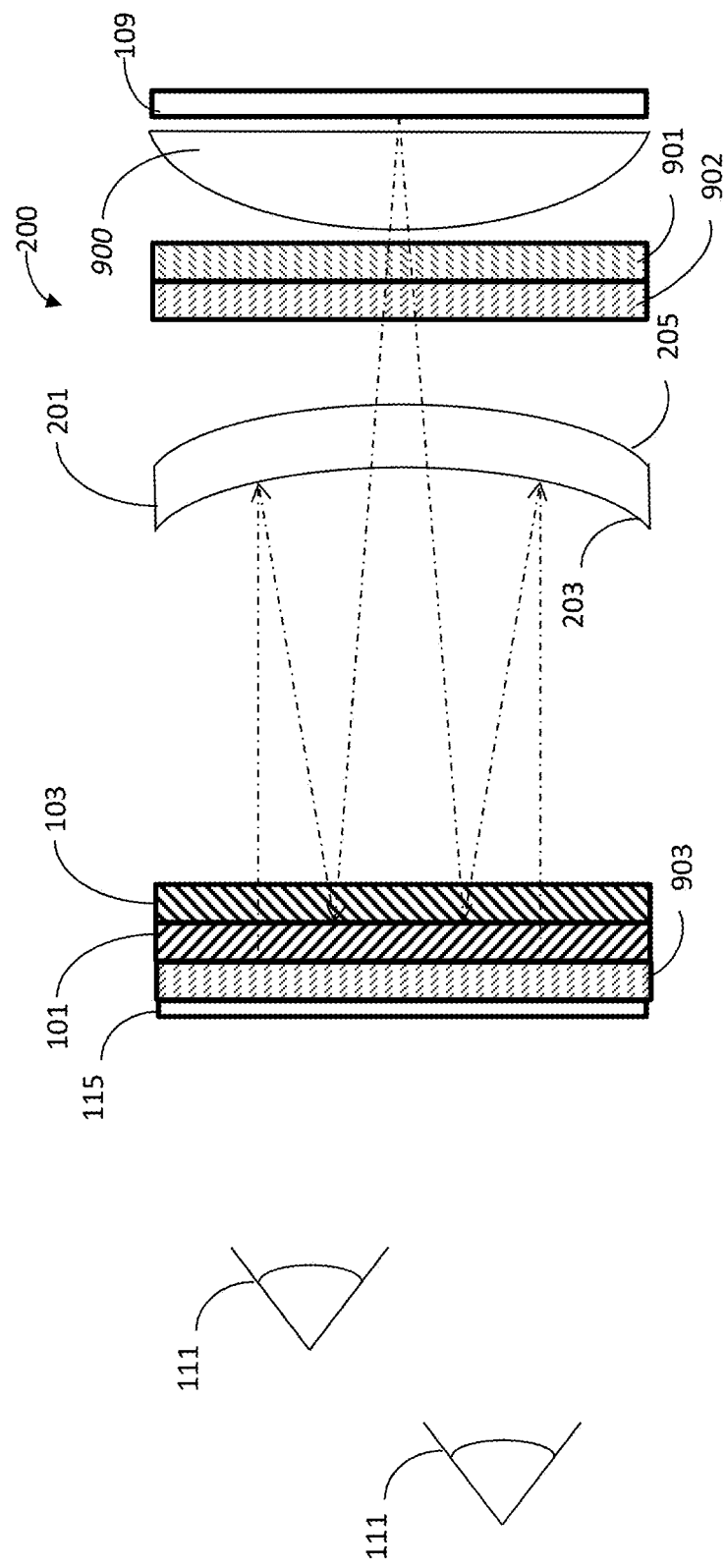
FIG. 4 is an illustration of another embodiment using single lens.

FIG. 3 illustrates an embodiment having a "monolithic" design form, but its features can be implemented in a design illustrated in FIG. 4, having separate elements, similar to that of FIG. 1. A polarizer (901) and retarder (902) are positioned in front of the field flattener lens (900). The polarizer (901) and quarterwave retarder (902) eliminate some "unwanted" light in the system that will not get magnified, which reduces the overall performance of the system if not absorbed or managed by these components. A combiner lens (201) with AR surface coating (205) and partially reflective surface (203), second retarder (103), and reflective selective polarizer (101) are arranged similar to embodiment of FIG. 1. A coverglass (903) is provided in viewing window 115 for viewing with both eyes simultaneously. While not shown in FIG. 4, the stack comprising a polarizer 309 and an AR coating 311 can be implemented in this embodiment as well.

Figure 5:
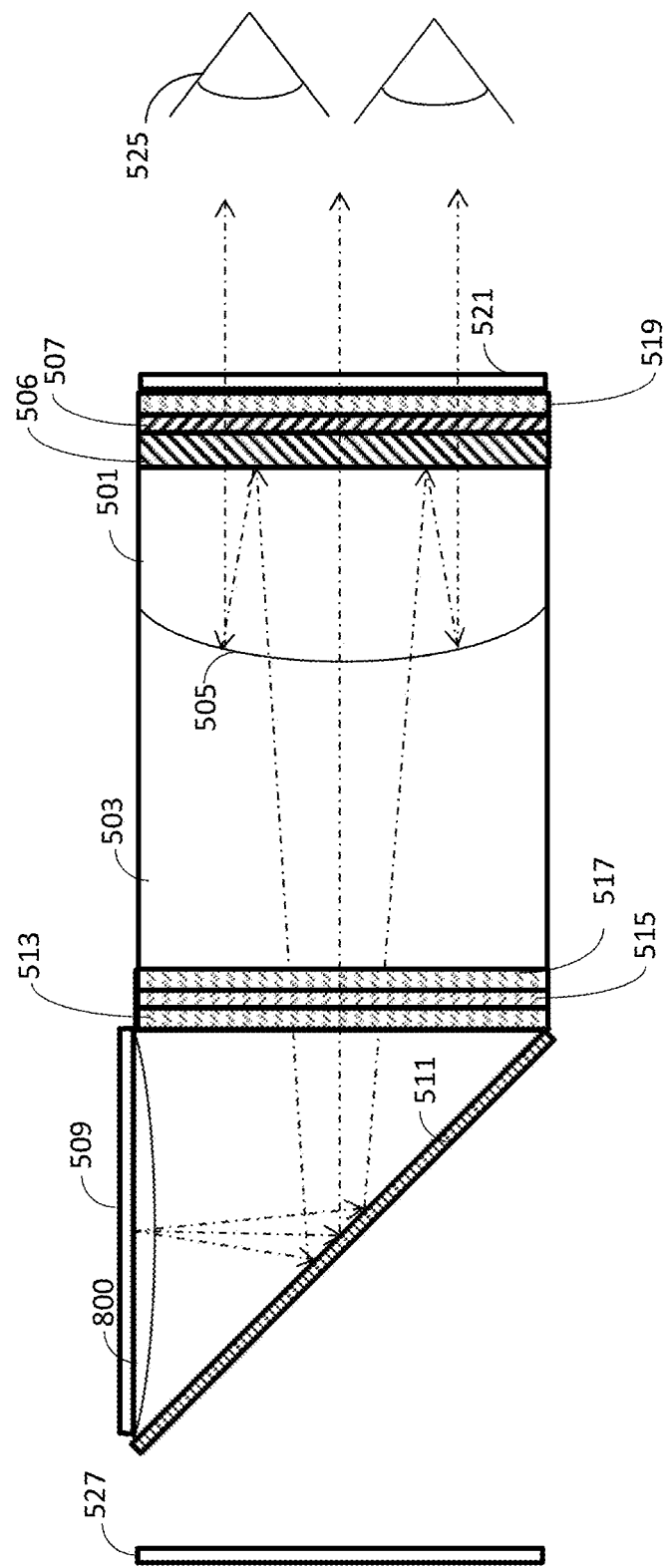
FIG. 5 is an illustration of an embodiment of the present invention which allows an image from a first source to be combined with an image from a second source.

FIG. 5 illustrates an embodiment having a see though design, i.e., allowing an image from a first source to be combined with an image from a second source. When used for a heads-up display, one source is an image source 509

(e.g., LCD, MOLED, etc.) and the second is the surrounding environment, which may be viewed via aperture 527.

The basic system in this embodiment is comprised of image source 509, field flattening lens 800, plano-convex singlet 501, plano-concave singlet 503, partial reflective coating 505 interposed between singlets 501 and 503, quarter wave plate (acting as circular polarizer) 506, PS element 507, and combiner 511. The system also includes AR coating 513 (optional), linear polarizer 515, and quarter wave plate 517. Quarter wave plate 517 circularly polarizes the linearly polarized source light so that it has the appropriate rotary sense for the quarter wave plate 506/PS element 507 combination. For improved performance the system also contains polarizer 519 and AR coating 521.

Many techniques are well known in the art for the fabrication of combiner 511. For example, combiner 511 can be a partial reflector which reflects the image from source 509 into the line of sight of an observer 525 while simultaneously passing the image of source 527 to the observer. Another type of combiner which can be used in this embodiment is a combiner which has a wavelength selective reflective coating. Such a combiner is ideally suited for applications in which only minimal information is required from source 509. For example, source 509 may be used to project markings (eg., targeting system) or instrumentation (e.g., fuel, air speed, altitude, etc. on a heads-up display) onto the image from source 527. In such applications only one or two wavelengths of light are necessary to provide the information from source 509. Thus combiner 511 can be designed to only reflect these one or two wavelengths while passing all other wavelengths of light. The advantage of this technique is that the reflective coating can be made very efficient, thus reflecting most of the radiation of the predetermined wavelengths from source 509 while passing all but a very small portion of the spectrum radiated by source 527.

If source 509 is an LCD, then the light emitted by source 509 is linearly polarized. Given this light source, in the preferred embodiment of this configuration combiner 511 is a polarizing beam splitter which is highly efficient in reflecting the polarized light emitted by source 509. Given a 90/10 beam splitter, and further assuming that source 527 emits unpolarized light, approximately 50 percent of the light emitted by source 527 will be passed by combiner 511. In this configuration linear polarizer 515 is not required.

In general, those skilled in the art to which this invention relates will recognize that many changes in construction and widely differing embodiments will suggest themselves without departing from the spirit and essential characteristics thereof. For example, the curvature of singlets 105 and 107 may be varied in order to impart different optical powers to the system. Further, depending upon the desired application, the shape of the interface between singlets 105 and 107 may be spherical, aspheric, or plano. Further still, the reflective coating between the singlets need not be a 50/50 dielectric coating. Further still, a singlet can be used instead of the doublet as previously noted.

Various embodiments were described above, wherein each embodiment is described with respect to certain features and elements. However, it should be understood that features and elements from one embodiment may be used in conjunction with other features and elements of other embodiments, and the description is intended to cover such possibilities, albeit not all permutations are described explicitly so as to avoid clutter.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. An optical collimating apparatus for focusing an image at infinity or at a desired finite distance as viewed by an observer, the apparatus comprising:
    an observation aperture configured for enabling viewing with two eyes simultaneously;
    an image source for producing said image with light of at least a first rotary sense of circular polarization;
    an optical element having a first side proximate to said image source;
    a partially reflective coating deposited on a surface of said optical element;
    a field flattener lens interposed between the image source and the observation aperture;
    a quarter wave plate proximate to a second side of said optical element, said quarter wave plate altering said first rotary sense of circular polarization to a first linear sense of polarization; and
    a polarization selective optical element proximate to said quarter wave plate, said polarization selective optical element substantially reflecting light of said first linear sense of polarization without altering said first linear sense of polarization, and said polarization selective optical element substantially transmitting light of a second linear sense of polarization, wherein said second linear sense of polarization is orthogonal to said first linear sense of polarization.

2. The apparatus of claim 1, wherein said surface of said optical element is concave.

3. The apparatus of claim 1, wherein said surface of said optical element is equivalent to said first side of said optical element.

4. The apparatus of claim 1, wherein said surface of said optical element is equivalent to said second side of said optical element.

5. The apparatus of claim 1, said optical element comprising:
    a first optical singlet having a first surface and a second surface; and
    a second optical singlet having a first surface and a second surface, said first surface of said first optical singlet coupled to said first surface of said second optical singlet, wherein said partially reflective coating is interposed between said first surface of said first optical singlet and said first surface of said second optical singlet.

6. The apparatus of claim 5, wherein said first surface of said first optical singlet is concave, said second surface of said first optical singlet is plano, said first surface of said second optical singlet is convex, and said second surface of said second optical singlet is plano.

7. The apparatus of claim 5, further comprising a combiner element to combine said image with a second image produced by a second image source, said second image source in a line-of-sight of the observer, said combiner element interposed between said second image source and said second surface of said first optical singlet.

8. The apparatus of claim 1, wherein said image source is comprised of a liquid crystal display transmitting linearly polarized light and a circular polarizer for converting said linearly polarized light to at least said first rotary sense of circular polarization.

9. The apparatus of claim 1, wherein said image source is comprised of a liquid crystal display transmitting linearly polarized light and a quarter wave retarder element for converting said linearly polarized light to at least said first rotary sense of circular polarization.

10. The apparatus of claim 1, wherein said image source is comprised of a non-polarizing source, a linear polarizing element, and a circular polarizer for converting linearly polarized light to at least said first rotary sense of circular polarization.

11. The apparatus of claim 1, wherein said image source is comprised of a non-polarizing source, a linear polarizing element, and a quarter wave retarder element for converting linearly polarized light to at least said first rotary sense of circular polarization.

12. The apparatus of claim 1, further comprising a polarizing element bonded to an exit surface of said polarization selective optical element.

13. The apparatus of claim 12, further comprising an anti-reflection coating bonded to an exit surface of said polarizing element.

14. The apparatus of claim 1, further comprising a combiner element to combine said image with a second image produced by a second image source, said second image source in the line-of-sight of the observer, said combiner element interposed between said second image source and said first side of said optical element.

15. The apparatus of claim 1, wherein the field flattener lens is interposed between the image source and the optical element.

16. The apparatus of claim 15, wherein the image source is adhered to the field flattener lens.

17. An optical apparatus for combining a first image and a second image, the apparatus comprising:
    a flat panel display producing said first image;
    an inlet aperture for admitting said second image;
    a viewing window configured to enable viewing with both eyes simultaneously;
    a field flattener lens interposed between the flat panel display and the viewing window;
    a first optical singlet having a first surface and a second surface;
    a second optical singlet having a first surface and a second surface, said first surface of said first optical singlet coupled to said first surface of said second optical singlet;
    a partially reflective coating interposed between said first surface of said first optical singlet and said first surface of said second optical singlet;
    a combiner configured for reflecting light from the flat panel display and transmitting light from the inlet aperture;
    a circular polarizer proximate to said second surface of said first optical singlet, wherein said circular polarizer converts light of a first linear polarization to light of a first rotary sense of circular polarization;
    a quarter wave plate proximate to said second surface of said second optical singlet, said quarter wave plate altering said first rotary sense of circular polarization to a first linear sense of polarization; and
    a polarization selective optical element proximate to said quarter wave plate, said polarization selective optical element substantially reflecting light of said first linear sense of polarization without altering said first linear sense of polarization, and said polarization selective optical element substantially transmitting light of a second linear sense of polarization, wherein said second linear sense of polarization is orthogonal to said first linear sense of polarization.

18. The apparatus of claim 17, wherein the combiner comprises:
    a polarizing beam splitter interposed between said flat panel display and said second surface of said first optical singlet, wherein a portion of said light of said first linear polarization and within a first wavelength band from said flat panel display is reflected by said polarizing beam splitter toward said first optical singlet, wherein at least a portion of light from a second image source is transmitted by said polarizing beam splitter toward said first optical singlet.

19. The apparatus of claim 17, wherein the field flattener lens is interposed between the flat panel display and the combiner.

20. The apparatus of claim 19, wherein the field flattener lens is adhered to the flat panel display.

* * * * *